May 11, 1965 L. M. CURTISS 3,183,297
CONNECTOR FOR OUTLET BOXES
Filed Oct. 24, 1962 2 Sheets-Sheet 1
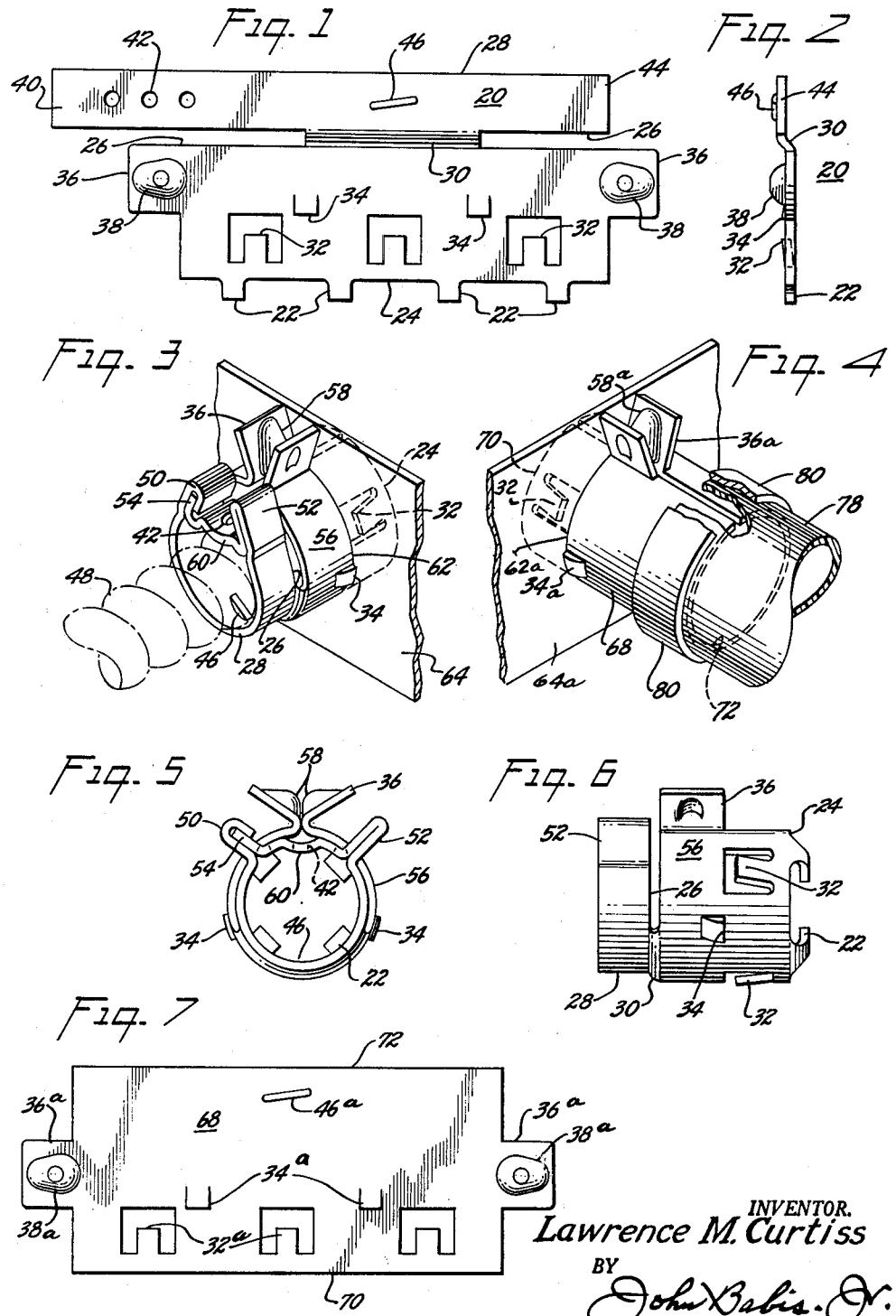
INVENTOR.
Lawrence M. Curtiss
BY
John Babis Jr.

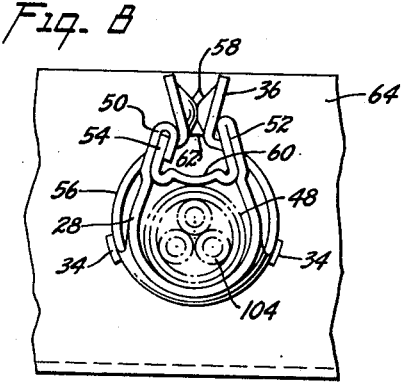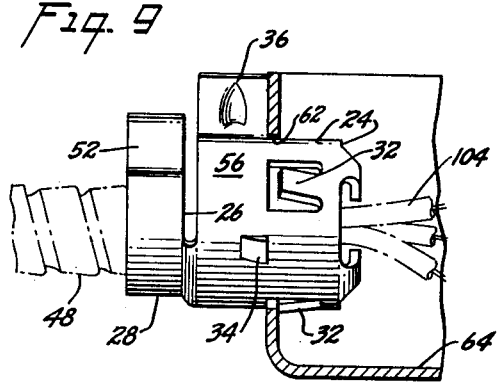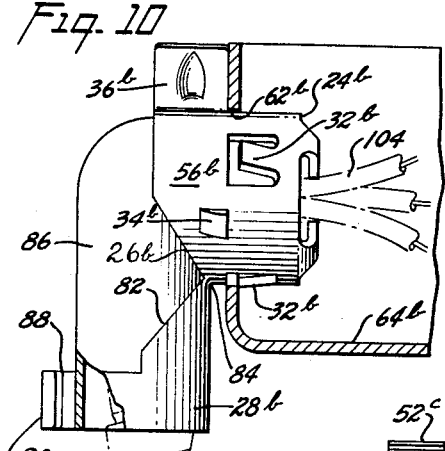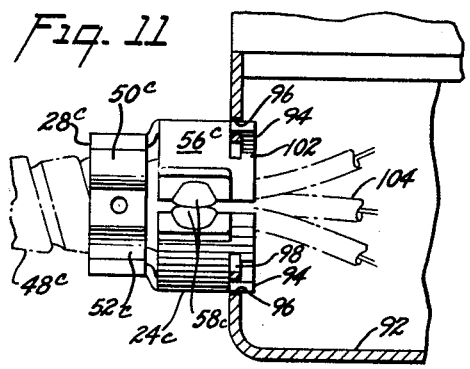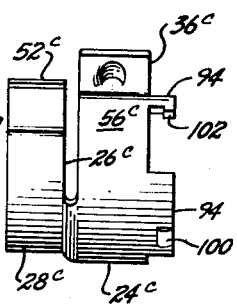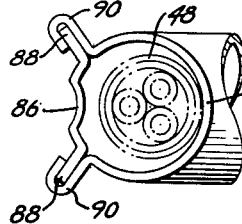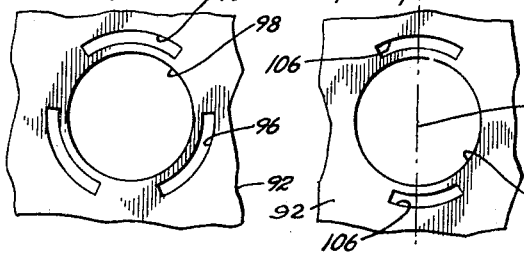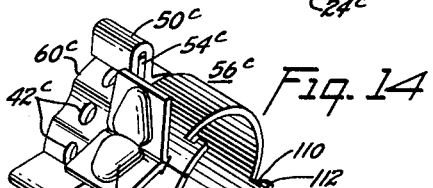

United States Patent Office 3,183,297
Patented May 11, 1965

3,183,297
CONNECTOR FOR OUTLET BOXES
Lawrence M. Curtiss, Mountainside, N.J., assignor to The Thomas & Betts Co., Elizabeth, N.J., a corporation of New Jersey
Filed Oct. 24, 1962, Ser. No. 232,692
12 Claims. (Cl. 174—65)

The present invention relates generally to devices for terminating and connecting electrical raceway conduits, armored cable and the like in and to electric outlet or junction boxes. More specifically, the invention relates to box connectors formed from sheet metal stampings into cylindrical member which include integral means adapted for locating a connector axially in a predetermined, relative position in an outlet box knock-out opening and additional integral means adapted for securing the same in said knock-out opening with an end portion of a conduit, armored cable or the like secured in the free opposite, end portion of the connector without the use of lock nuts, wedges, machine screws or like adjustable elements.

Box connectors of this character as shown heretofore included lock nuts, screws, wedges, bolts or other screw threaded elements for securing one end portion of a connector in and to an outlet box, and similar screw threaded elements for clamping an end portion of a conduit or armored cable in the opposite or free end portion of the box connector. Thus, such connectors possessed certain disadvantages in that they were more costly to manufacture, difficult to secure in and to an outlet box especially from within, and from without when locked in close quarters, and which were subject to being shaken loose in response to vibratory forces.

Accordingly, it is an object of the invention to provide a box connector as specified which is not subject to the above noted disadvantages.

A further object of the invention is to provide a box connector as specified which is devoid of any and all screw threaded elements, wedges, springs and the like.

Another object of the invention is to provide a box connector as specified wherein means for securing the connector to an outlet box, and to a conduit, armored cable or the like comprise integral parts of the body portion of said connector.

A further object of the invention is to provide a box connector as specified which is adapted to be secured to an outlet box, and to a conduit, armored cable or the like by the expansion and/or contraction of the body portion of said connector.

Another object of the invention is to provide a box connector as specified which is adapted to be secured in an outlet box knock-out opening and, within an open end of a conduit or the like without the use of lock nuts, wedges, machine screws or the like.

A further object of the invention is to provide a one piece box connector as specified which is adapted to be secured in a knock out opening in an outlet box and an end portion of a conduit, armored cable or the like without the use of lock nuts, wedges, machine screw elements or the like.

Another object of the invention is to provide a one piece box connector as specified which is extremely simple in construction, readily installed with a minimum of effort in close quarters, economical to manufacture, and highly efficient for the purposes intended.

A further object of the invention is to provide an outlet box connector which requires a minimum of time to install and which is particularly adapted to assembly-line type of installation where speed and accuracy is important.

With the above and other objects in view, the invention resides in the novel construction, combination, and arrangement of elements, the novel features of which are set forth with particularity in the appended claims, the invention itself, however, both as to its organization and method of operation, together with additional objects and advantages thereof being best understood from the following description of a specific embodiment thereof, when taken in connection with the accompanying drawing in which:

FIGURE 1 is a plan view of a sheet metal stamping of predetermined configuration as used in forming the improved cable connector;

FIGURE 2 is an end edge view of the sheet metal stamping shown in FIGURE 1;

FIGURE 3 is a perspective view, showing the improved cable connector with one end portion thereof secured in an outlet box knock out opening, and an end portion of an armored cable secured in the opposite free end portion of said connector in intruded relation;

FIGURE 4 is a similar perspective view showing a modified form of the connector with one end portion thereof secured in an outlet box knock out opening, and its opposite end portion secured within the inner diameter of an end portion of a non-metallic conduit having a metal ring on the outer diameter of said end portion;

FIGURE 5 is an end view of the improved connector per se, before use;

FIGURE 6 is a side elevation of the same;

FIGURE 7 is a small plan view of a sheet metal stamping of predetermined configuration as used in forming the modified form of connector shown in FIGURE 4;

FIGURE 8 is an end view of the improved connector showing the same as secured in an outlet box, knock out opening with an armored cable section secured in its opposite free end in intruded relation;

FIGURE 9 is an elevational side view of the same;

FIGURE 10 is an elevational side view of a further modfiication of the improved connector, wherein its respective end portions are disposed at right angles to each other as installed in use;

FIGURE 10a is an end view in elevation of the modified depending end portion of the connector as seen in FIGURE 10;

FIGURE 11 is a top plan view of another modified form of the improved connector, shown as secured in and to an opening provided therefor in a motor end housing;

FIGURE 12 is an elevational side view of the modified connector shown in FIGURE 11;

FIGURE 13 is an end view of the same, showing three connecting segments on the anchoring end thereof;

FIGURE 14 is a perspective view of the improved connector, shown in FIGURES 11, 12 and 13 with two connecting segments on the anchoring end thereof;

FIGURE 15 is a fragmentary elevational view of a motor end housing provided with angularly related arcuate slots about and concentric with a large clearance opening therein for receiving one end of the connector shown in FIGURES 12 and 13; and FIGURE 16 is a similar view of a motor end housing provided with a pair of diametrically opposite arcuate slots for receiving one end of the connector shown in FIGURE 14.

Referring to the drawings and to FIGURES 1 and 2 generally, a sheet metal blank having predetermined dimensions and an outline similar to that illustrated, is punched or cut from coiled strip or sheet metal such as cold rolled steel, for example, in conventional power press punch and form method.

In accordance with the invention, each blank is subjected to a stamping, punching, piercing and off-setting operation in succession to produce the final blank configuration exemplified by the stamping 20 in FIGURE 1.

As a result of the succession of operations aforesaid, each stamping 20 defines a plurality of equally spaced, rectangular projections 22, along one marginal portion 24 thereof; a pair of aligned, open ended slots 26, extending in opposite directions lengthwise of each stamping 20, adjacent the opposite marginal portion 28 thereof, the intervening surface between the adjacent ends of said slots 26 being bent, as at 30, to off-set the marginal portions 28 out of the plane of the stamping 20, as best shown in FIGURE 2.

In another operation, the intermediate portion of each stamping 20 is pierced to blank-out portions thereof for the purpose of forming small rectangular tabs 32 and 34, which extend partially out of the plane of the stamping to provide opposed points of abutment.

In a further operation, the center portion of each ear 36, at the respective ends of the stamping 20, is extruded or struck-out of the plane thereof to form a substantial pear-shape projection 38 on one side of each ear 36. In a still further operation, one end 40 of the marginal portion 28 of the stamping 20, is suitably pierced to form a plurality of aligned apertures 42 and the marginal portion 28 finally provided centrally of its opposite ends 40 and 44 with a short, linear projection 46, which is struck-out of the plane of the stamping 20 at a small angle to the marginal portion 28, corresponding with the pitch of the spirally wound metal on an armored cable 48, and adapted to serve as a key to be brought into bearing engagement therewith between its convolutions. The projections 22, slots 26, off-set portion 30, the tabs 32 and 34, struck-out of the body of the stamping 20; the bulbous projections 38 extruded out of the plane of each ear 36, and the narrow band-like end portions 40 and 44 along the marginal edge 28 of the stamping 20, as seen in FIGURE 1, are all provided as and for the purposes hereinafter specifically described.

After each stamping 20 has been formed in the manner above described, the ear 36 at each end thereof is bent substantially normal thereto as indicated in FIGURE 5. Similarly, the band-end portion 40 of the stamping 20 is bent, in the same direction, substantially normal thereto and the free end portion thereof partially bent upon itself in the opposite direction to form a hook-like end 50. The opposite band-end portion 44 is also bent normal to the stamping 20 in the same direction, then bent upon itself in an opposite direction to form a folded portion 52, and the remaining apertured portion thereof slightly curved and its free straight end turned slightly upwardly, as seen in FIGURES 3 and 5, for the final connector forming operation now to be described.

Subsequent to the foregoing, each stamping 20 is processed further in a special multi-stage transfer die-mounted on a suitable machine wherein the four rectangular projections 22 along one margin thereof, are bent inwardly toward each other at substantially right angles thereto while the stamping 20 is rolled into circular form with its opposite ends substantially in abutting engagement including the line of bend at the base of each ear 36. In another stage, the hooked end 50 and the opposite folded portion 52 of the marginal portion 28 of the stamping 20 are brought together and the free end 54 of its curved terminal portion positioned in the hooked end 50, and the hooked end closed thereon to complete a full circle having a smaller outside diameter than the outside of the opposite end portion thereof, by virtue of the relative proportions of the parts and the linear offset 30, formed in the stamping 20 between its marginal edge portions 24 and 28 respectively to form the completed connector 56, defining a pair of opposed, radially extending camming members 58 in substantial abutment and integral with the split end portion of the connector 56, and a pair of angularly spaced, radially extending members 50 and 52 including an aperture 42 to facilitate bending the end portion extending therebetween adapted to provide a foldable saddle portion 60 as illustrated in FIGURE 5.

Referring now to FIGURE 3, a completed cable connector 56 is shown as secured in a knock out opening 62 of a conventional outlet or junction box 64, by intruding its end portion 24 through the knock out opening until the struck out abutment members 32 are in contact with the inner side of the outlet box, and the struck out abutment members 34 in contact with the outer side of the outlet box, and radially diametrically expanding the intruded split end portion of the connector 56 by applying a suitable squeeze pressure exerting instrumentality, such as a plier-like hand tool for example, on or about the radially extending ears 36, defining the opposed camming members 58, and forcing the same toward each other whereby the camming members 58 coact to produce a spreading action which permanently expands the intruded split end portion 24 of the connector 56 against the defining periphery of the knock out opening 62 in an outlet box indicated at 64 to secure the connector 56 therein and at the same time render the abutment tabs 32 and 34 effective to hold the connector against relative endwise movement.

Further in accordance with the invention and as best shown in FIGURES 3, 5 and 8, the opposite, partially separated end portion 28 of the connector 56 is adapted for receiving and exercising an independent clamping action at least on and about a major portion of the outer periphery of a conventional armored cable 48 of a compatible size range, in response to application of squeeze pressure on the angularly spaced members 50 and 52 extending readily therefrom, whereby the radius or inner diameter of the connector end portion 28 is substantially reduced and the saddle portion 60 therebetween, which was initially provided with the spaced apertures 42, and partially bent across said apertures prior to the rolling of the stamping 20 into cylindrical form, finally bent radially inwardly on the armored cable 48, as best shown in FIGURE 8. Thus, relative endwise movement of the clamped cable 48 is obviated by the seating of the linear projection or key 46, formed in the connector end portion 28, between the convolutions of the spirally wound cable armor 48.

In a modified form of the invention, a connector 68, as shown in FIGURE 4, is formed from a metal stamping having the configuration shown in FIGURE 7, wherein both of the opposite end portions 70 and 72 of the connector 68 are adapted to be simultaneoulsy expanded substantially diametrically by a single coactable camming means 58a, formed by the radially extending ears 36a and the bulbous projections 38a struck out therefrom; the connector end portion 70 within a knock out opening 62a in an outlet box indicated at 64a in a manner identical with that described in connection with FIGURE 3, and the other connector end portion 72 intruded within the inner periphery of a conduit, such as an end portion of rigid or flexible non-metallic conduit 78, for example, reinforced with a metal band or ring 80 frictionally fitted on its outer periphery whereby the connector 68 is secured to the outlet box 64a and the conduit 78 connected simultaneously to the connector 68 in a single expanding operation thereon, as exemplified in FIGURE 4. The connector of FIGS. 4 and 7 includes struck-out abutment members 32a and 34a substantially identical to the members 32 and 34 of the previous modification, and a key or projection 46a substantially identical to the projection 46.

In a further modified form of the invention, as illustrated in FIGURE 10, the respective end portions 24b and 28b of the improved cable connector 56b shown partially separated by the slot 26b, similar to slot 26 in FIGURE 3, are further separated short of complete separation as in FIGURE 10, and the respective connector end portions 24b and 28b bent at right angles to each other as at 84. A suitable dished closure cap 86 is disposed over the open side of the connector end portions and adapted to be permanently secured to the connector end portion 28b by means of a pair of oppositely disposed ears 88 formed on one end of said cap 86, each ear being disposed under one of the two hooked ends which, in this modification, comprise the radially extending members 90 on the connector end portion 28b, whereby they are secured therebetween upon closing of the radially extending hook-end portions on said ears 88, as in FIGURE 10a in clamping an armor cable end portion 48 in said connector end portion 28b after the manner described in connection with FIGURE 3. Thus, the angular connector 56b, shown in FIGURE 10 is particularly adapted for use with (Greenfield) spirally wound metal armored cable wherein small right angular bends are not feasible in its application in the installation of electrically driven machinery and similar equipment.

Further, in accordance with the invention and with particular reference to FIGURES 11 through 13, the end portion 24c of the connector 56c, shown in the preceding figures, is modified for the connection thereof in or to the end housing, shell or cover 92 of an electric motor, for example, wherein the connector end portion 24 is provided with a plurality of arcuate projections 94 formed in angularly spaced relation on its end face for passage through a like number of angularly related arcuate slots 96, formed in the end housing, shell or cover 92 having a clearance opening 98 in concentric relation therewith and which slots 96 have the same radius and dimensions as the arcuate projections 94, two of said projections having a small rectangular protuberance 100 on their outer periphery which are inclined out of the plane thereof for coactable engagement with an edge portion of a like number of said arcuate slots 96. The remaining arcuate projection 94 is of T-head configuration and divided by reason of its formation in part on one end of each of the opposed, linear edge faces of the split cylindrical portion 24c, of the connector 56c to present separable, hook like ends 102, whereby when the arcuate projections 94 are extended through the arcuate slots 96 in the housing 92, and the cable connector 56c expanded through the coaction of the radially extending camming means 58c formed integral therewith in the manner described in connection with FIGURE 3, the rectangular protuberances 100 will hook over the defining edge portion of their correlated arcuate slot 96, and the square, hook like ends 102 of the T-head projection 94 brought into overlapping engagement with the opposite ends of its correlated arcuate slot 96. Thus, the end portion 24c of the cable connector 56c is securely locked in or to the motor housing or end cover 92 for leading a plurality of conductors 104 of an armor cable 48 into a motor, for example, for supplying current thereto.

Further in accordance with the invention, the integral means for securing the connector 56c to a motor housing 92, as described in connection with FIGURES 11 through 13, may be modified, as illustrated in FIGURES 14 and 16 wherein the housing or cover 92 is provided with a pair of arcuate slots 106 in concentric relation with a clearance opening 108 therein, the slots 106 being disposed in diametrically opposite relation, the lower slot 106, as seen in FIGURE 16 being shorter on the left side of the center line CL, by an amount equal to the depth of the recess 110, forming one of the hooked ends 112 of the arcuate projection 94 whereby the overall length of the lower slot 106 is less than the overall width of the lower arcuate projection 94 on the connector 56c, as seen in FIGURE 14.

Thus, in securing the modified connector 56c in FIGURE 14 to the housing 92, exemplified in FIGURE 16, one end of the lower arcuate projection 94 is inserted in the right end portion of the arcuate slot 106 as seen in FIGURE 16, in order to permit the other end of the arcuate projection 94 to pass through the left end portion of the arcuate slot 106. At this point the connector 56c is rotated clockwise to bring the upper or divided arcuate projection 94 on the connector into register with the upper arcuate slot 106 in FIGURE 16, and its subsequent extension therethrough and the final expansion of the connector 56c in the manner described in connection with FIGURE 3 whereby one end of the lower arcuate projection 94 is hooked on the defining edge of the left hand end of the lower slot 106, as seen in FIGURE 16, and the hooked ends of the upper divided arcuate projection 94 locked over the defining edge at each opposite end of the upper arcuate slot 106, as seen in FIGURE 16.

From the foregoing it will be obvious to those skilled in the art that the means employed for securing the connector fitting, generally indicated at 56c in FIGURES 11 through 14 to an end housing, cover or shell of an electric motor end portion, as shown at 92 in FIGURE 11, may also be employed to secure the connector 68 shown in FIGURE 4 to an end housing, cover or shell of an electric motor whereby to complete a conductor raceway thereto.

From the foregoing, when taken in connection with the drawings, it will be readily apparent that the instant invention provides an improvement in cable connectors which are adapted to be secured in an outlet box knock out opening and within an end opening of a conduit or equivalent, simultaneously by permanently expanding such connectors through the instrumentality of a simple coactable camming means, integral therewith, in response to the application of squeeze pressure on said camming means. Moreover, the instant invention also provides an improved cable connector wherein a split end portion thereof is adapted to be secured against the defining periphery of an outlet box knock out opening by a permanent expansion of said end portion, and an armored cable intruded and secured in the opopsite end portion of said connector by a permanent contraction of said connector end portion on and substantially about the outer periphery of the intruded armored cable portion.

In addition to the foregoing, the invention further provides an improved cable connector wherein means are formed integral therewith which are adapted: (1) to prevent relative endwise movement of the connector upon expanding one end portion thereof in a knock out opening in an outlet or junction box; (2) to prevent relative endwise movement of an armored cable upon clamping one end thereof in the opposite end portion of the connector by contracting the said opposite end portion thereon; and (3) to provide an improved connector wherein one end portion thereof is adapted to be positively locked or anchored in a plurality of angular spaced arcuate slots disposed about and in concentric relation with a conductor clearance opening formed in an end housing, shell or cover for an electric motor, by permanently expanding the said split end portion of the connector.

While the invention has been illustrated and described with respect to several embodiments thereof, it is to be expressly understood that various changes and modifications may be made therein without departing from the inventive concept underlying the same. Therefore, the herein described invention is not to be limited except as is necessitated by the prior art and the scope of the appended claims.

What is claimed is:

1. A connector fitting adapted to be secured in an outlet box knock out opening comprising a split cylindrical member, and coactable means integral with said cylindrical member, extending radially therefrom in opposed, diverging relation and including abutting camming members operable to expand said cylindrical member upon application of squeeze pressure on said coactable means.

2. A connector fitting adapted to be secured in an outlet box knock-out opening comprising a split cylindrical member, means integral with said cylindrical member extending radially therefrom in opposed diverging relation, and coactable means integral with said first named means operable to expand said cylindrical member in response to the application of squeeze pressure on said radially extending means.

3. A connector fitting adapted to be secured in an outlet box knock out opening comprising a split cylindrical member, means integral with said cylindrical member extending radially therefrom in opposed, diverging relation, coactable means integral with said first mentioned means operable to expand said cylindrical member upon application of squeeze pressure thereon, and means formed on said cylindrical member in opposed angularly spaced relation adapted for preventing relative endwise movement of said cylindrical member upon expansion thereof against the defining periphery of said knock out opening.

4. A connector fitting adapted to be secured in an outlet box knock out opening comprising a longitudinally split cylindrical member, means integral with said cylindrical member along its adjacent marginal edges defining the longitudinal split in said member, extending radially therefrom in opposed, diverging relation, and coactable means formed in opposed, contacting relation in said first named means, and operable upon application of squeeze pressure on said first named means to expand said cylindrical member against the defining periphery of said knock out opening.

5. A connector fitting adapted for securing an armored cable end portion in an outlet box knock out opening comprising a split cylindrical end portion, and a partially detached reduced end portion, means integral with said split end portion extending radially therefrom in opposed diverging relation, coactable means integral with said radially extending means operable to expand said split end portion in response to application of squeeze pressure thereon, said partially detached end portion including means integral therewith extending radially therefrom in spaced, angular relation operable to contract said reduced end portion on and substantially about said cable end portion in response to application of squeeze pressure on said last named means.

6. A connector fitting adapted for terminating an end portion of an armored cable in an outlet box knock out opening comprising a split cylindrical member, means integral with said cylindrical member extending radially therefrom in opposed diverging relation, coactable means integral with said first mentioned means operable to expand said cylindrical member in response to the application of squeeze pressure on said radially extending means, said cylindrical member having a reduced end portion adapted for freely receiving said cable end portion therein, and coactable means integral with said reduced end portion extending radially therefrom in opposed, angularly spaced, diverging relation, including an integral arcuate means therebetween, operable to contract said reduced end portion about and on said cable end portion upon application of squeeze pressure on and against said coactable means.

7. A connector fitting adapted for terminating an end portion of an armored cable in an outlet box knock out opening comprising a split cylindrical member, means integral with said cylindrical member extending radially therefrom in opposed diverging relation, coactable means integral with said first mentioned means operable to expand said cylindrical member in response to the application of squeeze pressure on said radially extending means, said cylindrical member having a reduced end portion adapted for freely receiving said cable end portion therein, coactable means integral with said reduced end portion extending radially therefrom in opposed, angularly spaced, diverging relation, including an integral arcuate means therebetween, operable to contract said reduced end portion about and on said cable end portion upon application of squeeze pressure on and against said coactable means, and means raised out of the inner peripheral surface of said reduced end portion substantially transversely of its axial center adapted to coact with the spiral armor on said cable end portion to prevent relative endwise movement thereof.

8. A connector fitting adapted for terminating an armored cable end portion in an outlet box knock out opening comprising a cylindrical member having a longitudinally split end portion provided with integral means for permanently expanding said split end portion against the defining periphery of a knock out opening, and a reduced end portion partially detached from said split end portion and disposed at right angles thereto provided with integral means for permanently contracting said reduced end portion on and about an armor cable end portion in response to application of squeeze pressure thereon, and a closure cap including retention means formed integral therewith covering the open side of said connector fitting with said retention means in coactable engagement with the radially extending means on said reduced end portion, said split end portion and said reduced end portion including integral means respectively for preventing relative endwise movement of said cylindrical member and said armor cable.

9. A connector fitting adapted for securing an armored cable end portion in an outlet box knock out opening comprising a split cylindrical member including a partially detached reduced end portion, means integral with said cylindrical member extending radially therefrom in opposed, diverging relation, coactable means formed integral with said first named means operable to expand said split member in response to application of squeeze pressure on said radially extending means, said reduced end portion including integral means extending radially therefrom in spaced, angular relation having an integral extension therebetween forming an arc of a circle, said last named radially extending means being operable to contract said reduced end portion on and substantially about said cable end portion in response to application of squeeze pressure thereon, and means formed integral with said reduced end portion adapted to coact with said cable end portion for preventing relative endwise movement thereof.

10. A connector fitting adapted for securing an armor cable end portion in an outlet box knock out opening comprising a split cylindrical member having a reduced end portion partially separated from said cylindrical member transversely of the split therein, means integral with said cylindrical member extending radially therefrom in opposed, diverging relation, coactable means formed integral with said first named means operable to expand said cylindrical member in response to application of squeeze pressure on said first named means, said reduced end portion including integral means extending radially therefrom in angularly spaced relation having an integral, arcuate extension therebetween forming a continuation of said reduced end portion, said last named means being operable to contract said reduced end portion including said saddle member on and about an armor cable end portion in response to application of squeeze pressure thereon.

11. A connector fitting adapted to be secured to a housing provided with an opening therein having a plurality of arcuate slots disposed in spaced angular relation about said opening in concentric relation therewith, comprising a split cylindrical member, means integral with said member extending radially therefrom in opposed diverging relation, coactable means formed on said first named means in abutting engagement operable to expand said cylindrical member in response to application of squeeze pressure on said first named means, and a plurality of arcuate projections formed on one end of said member in angularly spaced relation adapted to be inserted in said slots, one of said projections being divided by the split in said member and each half thereof provided with means for engaging the defining edge of the opposite ends of one of said slots whereby to partly secure said connector fitting, and means formed on the outer surface of the remaining arcuate projections adapted to engage the inner edge of their correlated slots whereby to prevent withdrawal of said remaining projections out of said correlated slots.

12. A connector fitting, adapted to be secured to a housing provided with an opening therein having a pair of arcuate slots formed about said opening in diametrically opposite, concentric relation therewith, comprising a split cylindrical member, means integral with said member extending radially therefrom in opposed diverging relation, coactable means formed on said first named means in abutting engagement operable to expand said cylindrical member in response to application of squeeze pressure on said first named means, and a pair of arcuate projections formed on one end of said member in diametrically opposite relation adapted to be extended through the arcuate slots in said housing, one of said arcuate projections being divided by the split in said cylindrical member and said pair of arcuate projections provided at each of their opposite ends with means adapted for engaging the defining inner edge of the opposite ends of said slots, one of said arcuate slots being shorter than the width of said arcuate projections whereby to connect one end of the arcuate projection opposite said divided arcuate projection on the defining inner edge of one end of said shorter slot, and the insertion of the split arcuate projection in its correlated slot upon slight clockwise rotation of said connector and the subsequent expansion of said cylindrical member to spread the split arcuate projection in its correlated arcuate slot to positively secure the cylindrical member to said housing.

References Cited by the Examiner

UNITED STATES PATENTS

| | | | |
|---|---|---|---|
| 978,398 | 12/10 | Rischard | 24—19 |
| 1,491,873 | 4/24 | McMurtrie | 285—306 |
| 2,413,927 | 1/47 | Robertson | 248—56 |
| 2,490,253 | 12/49 | Buchanan | 174—65 |
| 2,967,722 | 1/61 | Lifka | 285—306 |

FOREIGN PATENTS

| | | |
|---|---|---|
| 461,048 | 2/37 | Great Britain. |
| 713,104 | 8/54 | Great Britain. |
| 1,076,454 | 2/60 | Germany. |

JOHN F. BURNS, *Primary Examiner.*

JOHN P. WILDMAN, *Examiner.*